United States Patent
Zhou et al.

(10) Patent No.: US 12,471,176 B2
(45) Date of Patent: Nov. 11, 2025

(54) EXTENSION OF DRX ON FOR BFR

(71) Applicant: QUALCOMM Incorporated, San Diego, CA (US)

(72) Inventors: Shanyu Zhou, San Diego, CA (US); Jelena Damnjanovic, Del Mar, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 821 days.

(21) Appl. No.: 17/651,780

(22) Filed: Feb. 18, 2022

(65) Prior Publication Data

US 2023/0269816 A1    Aug. 24, 2023

(51) Int. Cl.
*H04B 17/373* (2015.01)
*H04W 76/28* (2018.01)
*H04B 17/309* (2015.01)

(52) U.S. Cl.
CPC .......... *H04W 76/28* (2018.02); *H04B 17/373* (2015.01); *H04B 17/309* (2015.01)

(58) Field of Classification Search
CPC ... H04B 17/373; H04B 17/309; H04W 76/28; Y02D 30/70
See application file for complete search history.

(56) References Cited

U.S. PATENT DOCUMENTS

2020/0053824 A1* 2/2020 He .................... H04B 17/309
2020/0092936 A1* 3/2020 Yang ................ H04W 28/0268
2021/0297139 A1* 9/2021 Kwon ............... H04W 52/028

FOREIGN PATENT DOCUMENTS

WO    WO-2021093670 A1 * 5/2021 ............ H04W 24/08

* cited by examiner

*Primary Examiner* — Melvin C Marcelo
*Assistant Examiner* — Natali Pascual Peguero
(74) *Attorney, Agent, or Firm* — Procopio, Cory, Hargreaves & Savitch

(57) ABSTRACT

Methods, apparatuses, and computer-readable storage medium for extending DRX ON duration are provided. An example method includes identifying a predicted BFD within a DRX OFF duration associated with a configured DRX. The example method may further include extend, based on the predicted BFD, a DRX ON duration associated with the configured DRX. The example method may further include continuing to perform one or more BFD related procedures during the DRX ON duration.

30 Claims, 11 Drawing Sheets

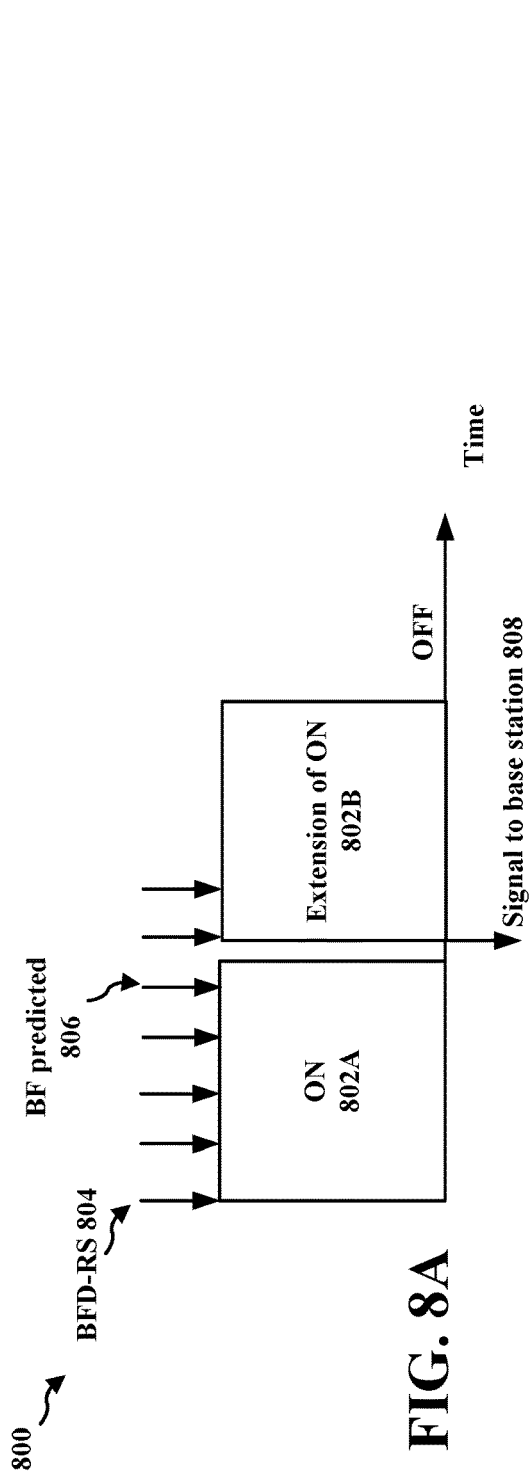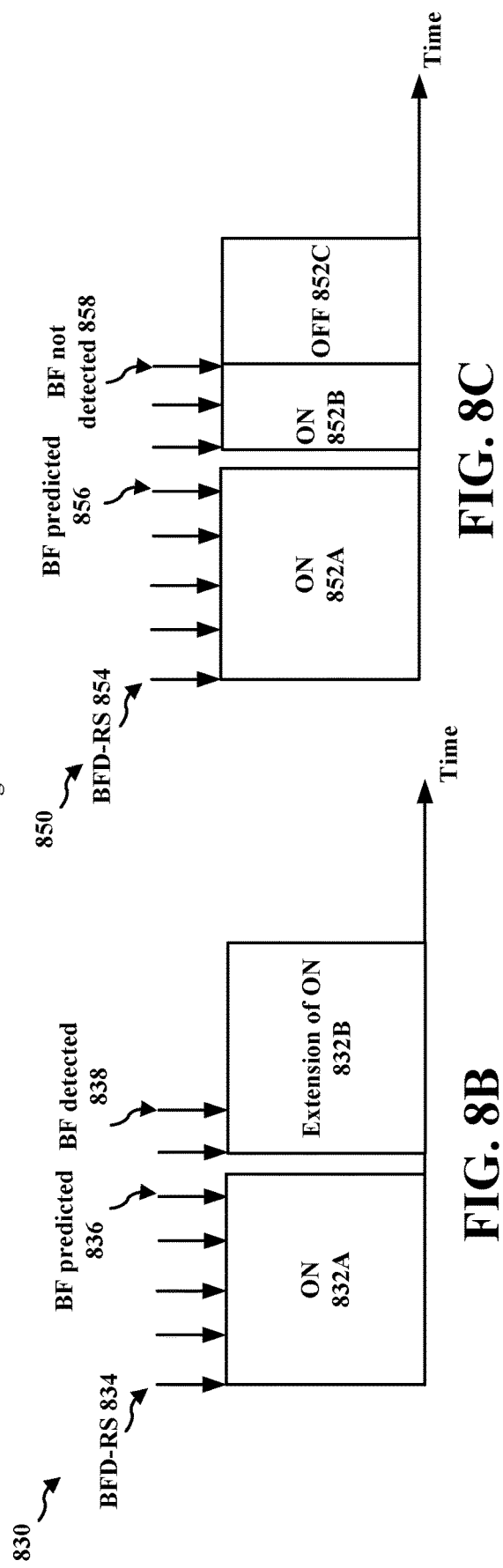

EXTENSION OF DRX ON FOR BFR

TECHNICAL FIELD

The present disclosure relates generally to communication systems, and more particularly, to wireless communication systems with beam failure detection (BFD) and discontinuous reception (DRX).

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects. This summary neither identifies key or critical elements of all aspects nor delineates the scope of any or all aspects. Its sole purpose is to present some concepts of one or more aspects in a simplified form as a prelude to the more detailed description that is presented later.

In an aspect of the disclosure, a method, a computer-readable medium, and an apparatus at a user equipment (UE) are provided. The apparatus may include a memory and at least one processor coupled to the memory. The at least processor may be configured, based at least in part on information stored in the memory, to identify a predicted BFD within a DRX OFF duration associated with a configured DRX. The at least processor may be further configured, based at least in part on information stored in the memory, to extend, based on the predicted BFD, a DRX ON duration associated with the configured DRX. The memory and the at least one processor coupled to the memory may be further configured to continue to perform one or more BFD related procedures during the DRX ON duration.

In another aspect of the disclosure, a method, a computer-readable medium, and an apparatus at a network entity are provided. The apparatus may include a memory and at least one processor coupled to the memory. The at least processor may be further configured, based at least in part on information stored in the memory, to receive a report indicating an extension of a DRX ON duration associated with a UE. The at least processor may be further configured, based at least in part on information stored in the memory, to transmit a beam switching command for initiating a beam switching procedure associated with the UE.

To the accomplishment of the foregoing and related ends, the one or more aspects comprise the features hereinafter fully described and particularly pointed out in the claims. The following description and the drawings set forth in detail certain illustrative features of the one or more aspects. These features are indicative, however, of but a few of the various ways in which the principles of various aspects may be employed.

BRIEF DESCRIPTION OF THE DRAWINGS

FIG. 8A is a diagram illustrating example extending of DRX ON duration by an extension of ON duration upon predicting beam failure based on BFD-RS.

FIG. 8B is a diagram illustrating example beam failure detected after extending DRX ON duration by an extension of ON duration.

FIG. 8C is a diagram illustrating an example in which a beam failure is not detected after extending DRX ON duration an extension of ON duration.

DETAILED DESCRIPTION

Figure 1:
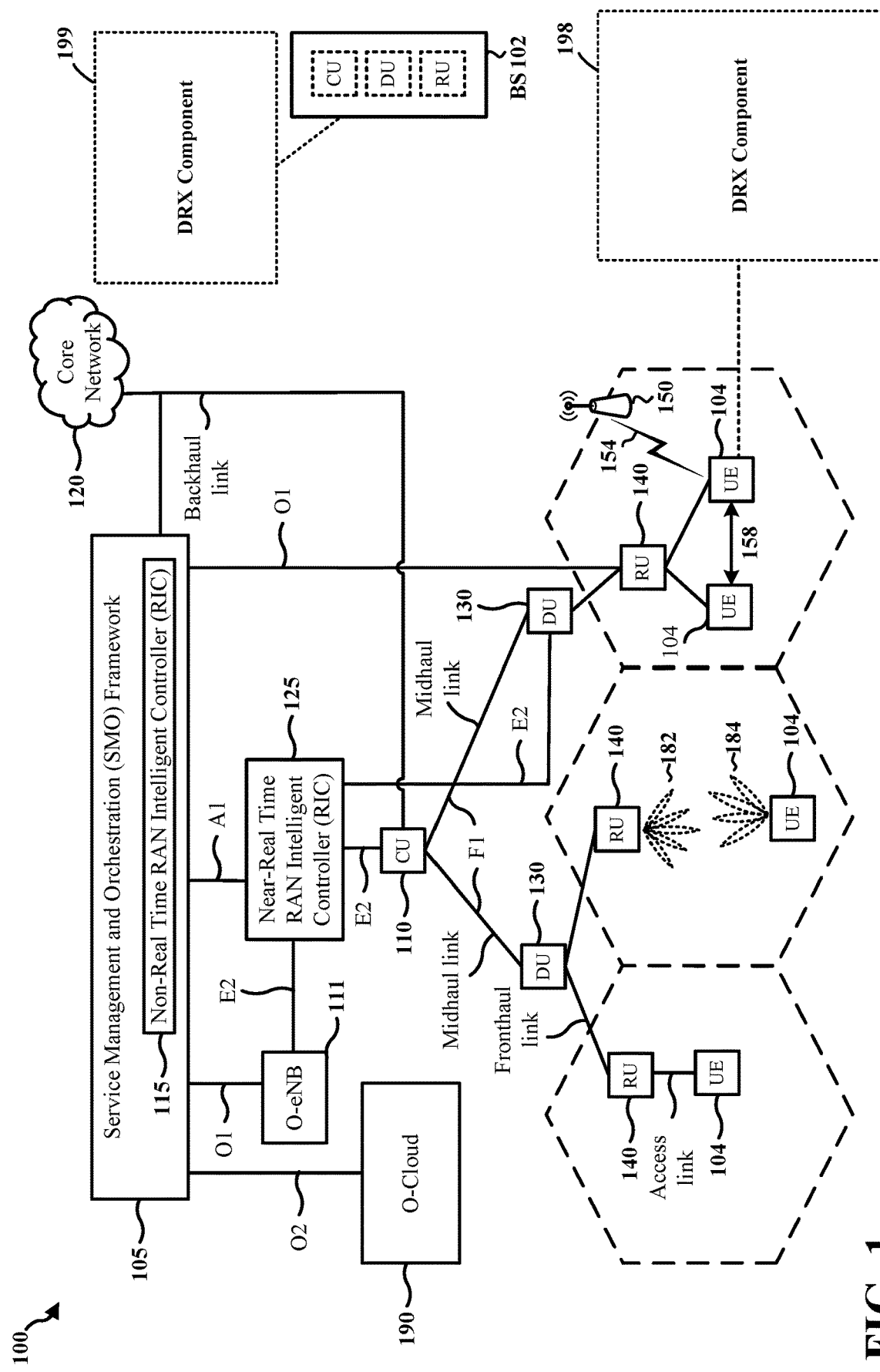
FIG. 1 is a diagram illustrating an example of a wireless communications system and an access network.

To provide better quality of service (QoS), aspects provided herein enable a UE to predict beam failures and accordingly extend a DRX ON duration to address predicted beam failures. In addition, aspects provided herein may provide signaling mechanisms for UE to efficiently notify the network when a DRX ON duration is extended. Aspects provided herein may improve BFD/beam failure recovery (BFR) accuracy and allow more time of BFD-RS monitoring during DRX OFF duration to confirm beam failure. Aspects provided herein may also make BFD/BFR more timely because a UE may declare a beam failure during DRX OFF duration and initiate BFR immediately, e.g., during the DRX OFF duration or without waiting for the DRX ON duration. Overall, aspects provided herein may improve QoS and enhance beam connection consistency, reduce latency, and improve reliability.

The detailed description set forth below in connection with the drawings describes various configurations and does not represent the only configurations in which the concepts described herein may be practiced. The detailed description includes specific details for the purpose of providing a thorough understanding of various concepts. However, these concepts may be practiced without these specific details. In some instances, well known structures and components are shown in block diagram form in order to avoid obscuring such concepts.

Several aspects of telecommunication systems are presented with reference to various apparatus and methods. These apparatus and methods are described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software, whether referred to as software, firmware, middleware, microcode, hardware description language, or otherwise, shall be construed broadly to mean instructions, instruction sets, code, code segments, program code, programs, subprograms, software components, applications, software applications, software packages, routines, subroutines, objects, executables, threads of execution, procedures, functions, or any combination thereof.

Accordingly, in one or more example aspects, implementations, and/or use cases, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects, implementations, and/or use cases are described in this application by illustration to some examples, additional or different aspects, implementations and/or use cases may come about in many different arrangements and scenarios. Aspects, implementations, and/or use cases described herein may be implemented across many differing platform types, devices, systems, shapes, sizes, and packaging arrangements. For example, aspects, implementations, and/or use cases may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described examples may occur. Aspects, implementations, and/or use cases may range a spectrum from chip-level or modular components to non-modular, non-chip-level implementations and further to aggregate, distributed, or original equipment manufacturer (OEM) devices or systems incorporating one or more techniques herein. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). Techniques described herein may be practiced in a wide variety of devices, chip-level components, systems, distributed arrangements, aggregated or disaggregated components, end-user devices, etc. of varying sizes, shapes, and constitution.

Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, access point (AP), a transmit receive point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU can be implemented as virtual units, i.e., a virtual central unit (VCU), a virtual distributed unit (VDU), or a virtual radio unit (VRU).

Base station operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

FIG. 1 is a diagram 100 illustrating an example of a wireless communications system and an access network. The illustrated wireless communications system includes a disaggregated base station architecture. The disaggregated base station architecture may include one or more CUs 110 that can communicate directly with a core network 120 via a backhaul link, or indirectly with the core network 120 through one or more disaggregated base station units (such as a Near-Real Time (Near-RT) RAN Intelligent Controller (RIC) 125 via an E2 link, or a Non-Real Time (Non-RT) RIC 115 associated with a Service Management and Orchestration (SMO) Framework 105, or both). A CU 110 may communicate with one or more DUs 130 via respective midhaul links, such as an F1 interface. The DUs 130 may communicate with one or more RUs 140 via respective fronthaul links. The RUs 140 may communicate with respective UEs 104 via one or more radio frequency (RF) access links. In some implementations, the UE 104 may be simultaneously served by multiple RUs 140.

Each of the units, i.e., the CUs 110, the DUs 130, the RUs 140, as well as the Near-RT RICs 125, the Non-RT RICs 115, and the SMO Framework 105, may include one or more interfaces or be coupled to one or more interfaces configured to receive or to transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or to transmit signals over a wired transmission medium to one or more of the other units. Additionally, the units can include a wireless interface, which may include a receiver, a transmitter, or a transceiver (such as an RF transceiver), configured to receive or to transmit signals, or both, over a wireless transmission medium to one or more of the other units.

In some aspects, the CU 110 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 110. The CU 110 may be configured to handle user plane functionality (i.e., Central Unit—User Plane (CU-UP)), control plane functionality (i.e., Central Unit—Control Plane (CU-CP)), or a combination thereof. In some implementations, the CU 110 can be logically split into one or more CU-UP units and one or more CU-CP units. The CU-UP unit can communicate bidirectionally with the CU-CP unit via an interface, such as an E1 interface when implemented in an O-RAN configuration. The CU 110 can be implemented to communicate with the DU 130, as necessary, for network control and signaling.

The DU 130 may correspond to a logical unit that includes one or more base station functions to control the operation of one or more RUs 140. In some aspects, the DU 130 may host one or more of a radio link control (RLC) layer, a medium access control (MAC) layer, and one or more high physical (PHY) layers (such as modules for forward error correction (FEC) encoding and decoding, scrambling, modulation, demodulation, or the like) depending, at least in part, on a functional split, such as those defined by 3GPP. In some aspects, the DU 130 may further host one or more low PHY layers. Each layer (or module) can be implemented with an interface configured to communicate signals with other layers (and modules) hosted by the DU 130, or with the control functions hosted by the CU 110.

Lower-layer functionality can be implemented by one or more RUs 140. In some deployments, an RU 140, controlled by a DU 130, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 140 can be implemented to handle over the air (OTA) communication with one or more UEs 104. In some implementations, real-time and non-real-time aspects of control and user plane communication with the RU(s) 140 can be controlled by the corresponding DU 130. In some scenarios, this configuration can enable the DU(s) 130 and the CU 110 to be implemented in a cloud-based RAN architecture, such as a vRAN architecture.

The SMO Framework 105 may be configured to support RAN deployment and provisioning of non-virtualized and virtualized network elements. For non-virtualized network elements, the SMO Framework 105 may be configured to support the deployment of dedicated physical resources for RAN coverage requirements that may be managed via an operations and maintenance interface (such as an O1 interface). For virtualized network elements, the SMO Framework 105 may be configured to interact with a cloud computing platform (such as an open cloud (O-Cloud) 190) to perform network element life cycle management (such as to instantiate virtualized network elements) via a cloud computing platform interface (such as an O2 interface). Such virtualized network elements can include, but are not limited to, CUs 110, DUs 130, RUs 140 and Near-RT RICs 125. In some implementations, the SMO Framework 105 can communicate with a hardware aspect of a 4G RAN, such as an open eNB (O-eNB) 111, via an O1 interface. Additionally, in some implementations, the SMO Framework 105 can communicate directly with one or more RUs 140 via an O1 interface. The SMO Framework 105 also may include a Non-RT RIC 115 configured to support functionality of the SMO Framework 105.

The Non-RT RIC 115 may be configured to include a logical function that enables non-real-time control and optimization of RAN elements and resources, artificial intelligence (AI)/machine learning (ML) (AI/ML) workflows including model training and updates, or policy-based guidance of applications/features in the Near-RT RIC 125. The Non-RT RIC 115 may be coupled to or communicate with (such as via an A1 interface) the Near-RT RIC 125. The Near-RT RIC 125 may be configured to include a logical function that enables near-real-time control and optimization of RAN elements and resources via data collection and actions over an interface (such as via an E2 interface) connecting one or more CUs 110, one or more DUs 130, or both, as well as an O-eNB, with the Near-RT RIC 125.

In some implementations, to generate AI/ML models to be deployed in the Near-RT RIC 125, the Non-RT RIC 115 may receive parameters or external enrichment information from external servers. Such information may be utilized by the Near-RT RIC 125 and may be received at the SMO Framework 105 or the Non-RT RIC 115 from non-network data sources or from network functions. In some examples, the Non-RT RIC 115 or the Near-RT RIC 125 may be configured to tune RAN behavior or performance. For example, the Non-RT RIC 115 may monitor long-term trends and patterns for performance and employ AI/ML models to perform corrective actions through the SMO Framework 105 (such as reconfiguration via O1) or via creation of RAN management policies (such as A1 policies).

At least one of the CU 110, the DU 130, and the RU 140 may be referred to as a base station 102. Accordingly, a base station 102 may include one or more of the CU 110, the DU 130, and the RU 140 (each component indicated with dotted lines to signify that each component may or may not be included in the base station 102). The base station 102 provides an access point to the core network 120 for a UE 104. The base stations 102 may include macrocells (high power cellular base station) and/or small cells (low power cellular base station). The small cells include femtocells, picocells, and microcells. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links between the RUs 140 and the UEs 104 may include uplink (UL) (also referred to as reverse link) transmissions from a UE 104 to an RU 140 and/or downlink (DL) (also referred to as forward link) transmissions from an RU 140 to a UE 104. The communication links may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL wireless wide area network (WWAN) spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, Bluetooth, Wi-Fi based on the Institute of Electrical and Electronics Engineers (IEEE) 802.11 standard, LTE, or NR.

The wireless communications system may further include a Wi-Fi AP 150 in communication with UEs (also referred to as Wi-Fi stations (STAs)) 104 via communication link 154, e.g., in a 5 GHz unlicensed frequency spectrum or the like. When communicating in an unlicensed frequency spectrum, the UEs 104/AP 150 may perform a clear channel assessment (CCA) prior to communicating in order to determine whether the channel is available.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHz-71 GHz), FR4 (71 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR2-2, and/or FR5, or may be within the EHF band.

The base station 102 and the UE 104 may each include a plurality of antennas, such as antenna elements, antenna panels, and/or antenna arrays to facilitate beamforming. The base station 102 may transmit a beamformed signal 182 to the UE 104 in one or more transmit directions. The UE 104 may receive the beamformed signal from the base station 102 in one or more receive directions. The UE 104 may also transmit a beamformed signal 184 to the base station 102 in one or more transmit directions. The base station 102 may receive the beamformed signal from the UE 104 in one or more receive directions. The base station 102/UE 104 may perform beam training to determine the best receive and transmit directions for each of the base station 102/UE 104. The transmit and receive directions for the base station 102 may or may not be the same. The transmit and receive directions for the UE 104 may or may not be the same.

The base station 102 may include and/or be referred to as a gNB, Node B, eNB, an access point, a base transceiver station, a radio base station, a radio transceiver, a transceiver function, a basic service set (BSS), an extended service set (ESS), a transmit reception point (TRP), network node, network entity, network equipment, or some other suitable terminology. The base station 102 can be implemented as an integrated access and backhaul (IAB) node, a relay node, a sidelink node, an aggregated (monolithic) base station with a baseband unit (BBU) (including a CU and a DU) and an RU, or as a disaggregated base station including one or more of a CU, a DU, and/or an RU.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in some aspects, the UE 104 may include a DX DRX component 198. In some aspects, the DRX component 198 may be configured to identify a predicted beam failure detection (BFD) within a discontinuous reception (DRX) OFF duration associated with a configured DRX. In some aspects, the DRX component 198 may be further configured to extend, based on the predicted BFD, a DRX ON duration associated with the configured DRX. In some aspects, the DRX component 198 may be further configured to continue to perform one or more BFD related procedures during the DRX ON duration.

In certain aspects, the base station 102 may include a DRX component 199. In some aspects, the DRX component 199 may be configured to receive a report indicating an extension of a discontinuous reception (DRX) ON duration associated with a UE. In some aspects, the DRX component 199 may be further configured to transmit a beam switching command for initiating a beam switching procedure associated with the UE. Although the following description may be focused on 5G NR, the concepts described herein may be applicable to other similar areas, such as LTE, LTE-A, CDMA, GSM, and other wireless technologies.

Figure 2:
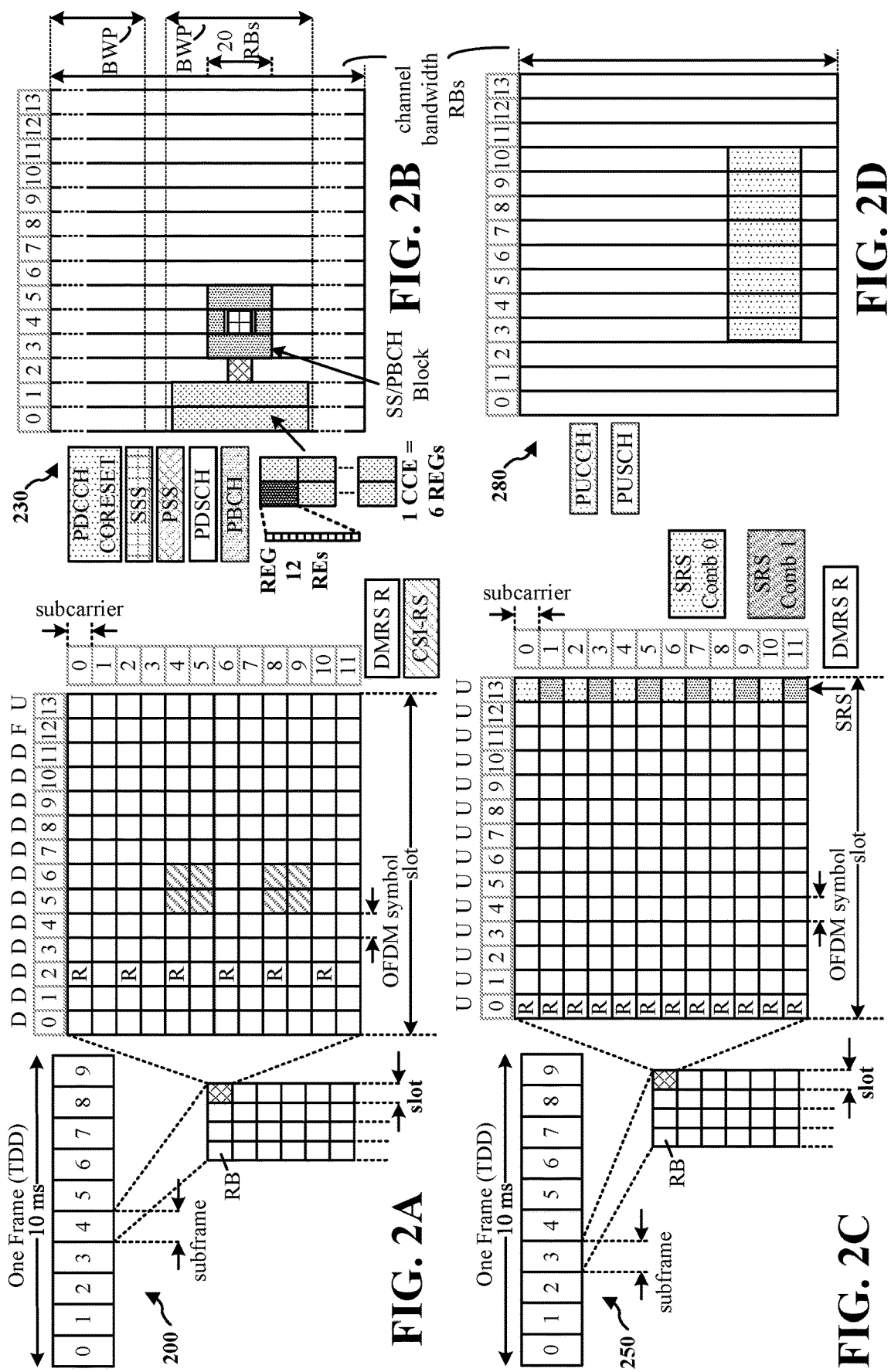
FIG. 2A is a diagram illustrating an example of a first frame, in accordance with various aspects of the present disclosure.
FIG. 2B is a diagram illustrating an example of DL channels within a subframe, in accordance with various aspects of the present disclosure.
FIG. 2C is a diagram illustrating an example of a second frame, in accordance with various aspects of the present disclosure.
FIG. 2D is a diagram illustrating an example of UL channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) and, effectively, the symbol length/duration, which is equal to 1/SCS.

| $\mu$ | SCS $\Delta f = 2^{\mu} \cdot 15 [\text{kHz}]$ | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

For normal CP (14 symbols/slot), different numerologies $\mu$ 0 to 4 allow for 1, 2, 4, 8, and 16 slots, respectively, per subframe. For extended CP, the numerology 2 allows for 4 slots per subframe. Accordingly, for normal CP and numerology $\mu$, there are 14 symbols/slot and 2 slots/subframe. The subcarrier spacing may be equal to $2^{\mu}*15$ kHz, where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of normal CP with 14 symbols per slot and numerology $\mu=2$ with 4 slots per subframe. The slot duration is 0.25 ms, the subcarrier spacing is 60 kHz, and the symbol duration is approximately 16.67 $\mu$s. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme. As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
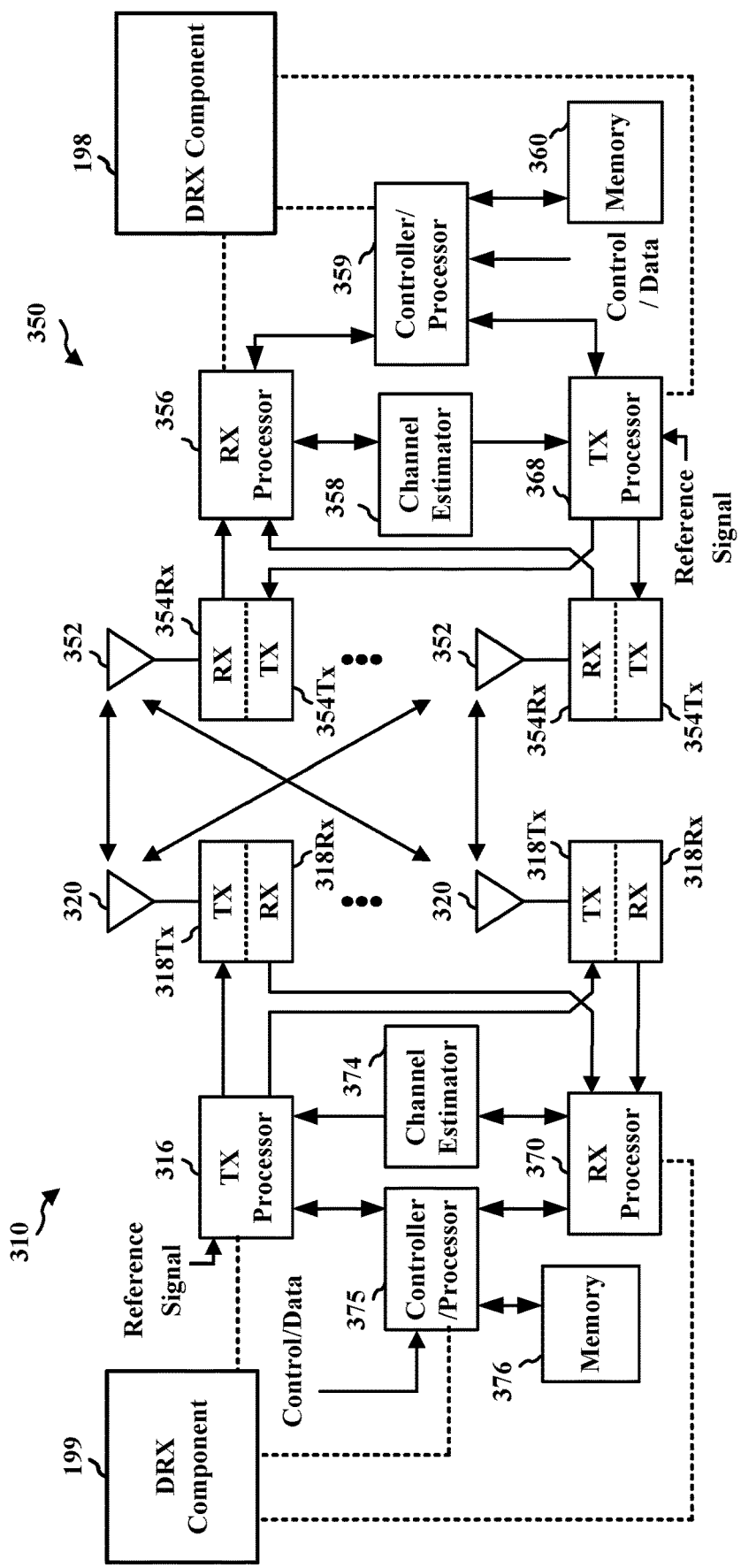
FIG. 3 is a diagram illustrating an example of a base station and user equipment (UE) in an access network.

FIG. 3 is a block diagram of a base station 310 in communication with a UE 350 in an access network. In the DL, Internet protocol (IP) packets may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE

350. Each spatial stream may then be provided to a different antenna 320 via a separate transmitter 318Tx. Each transmitter 318Tx may modulate a radio frequency (RF) carrier with a respective spatial stream for transmission.

At the UE 350, each receiver 354Rx receives a signal through its respective antenna 352. Each receiver 354Rx recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354Tx. Each transmitter 354Tx may modulate an RF carrier with a respective spatial stream for transmission.

The UL transmission is processed at the base station 310 in a manner similar to that described in connection with the receiver function at the UE 350. Each receiver 318Rx receives a signal through its respective antenna 320. Each receiver 318Rx recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets. The controller/processor 375 is also responsible for error detection using an ACK and/or NACK protocol to support HARQ operations.

At least one of the TX processor 368, the RX processor 356, and the controller/processor 359 may be configured to perform aspects in connection with DRX component 198 of FIG. 1.

At least one of the TX processor 316, the RX processor 370, and the controller/processor 375 may be configured to perform aspects in connection with DRX component 199 of FIG. 1.

Figure 4:
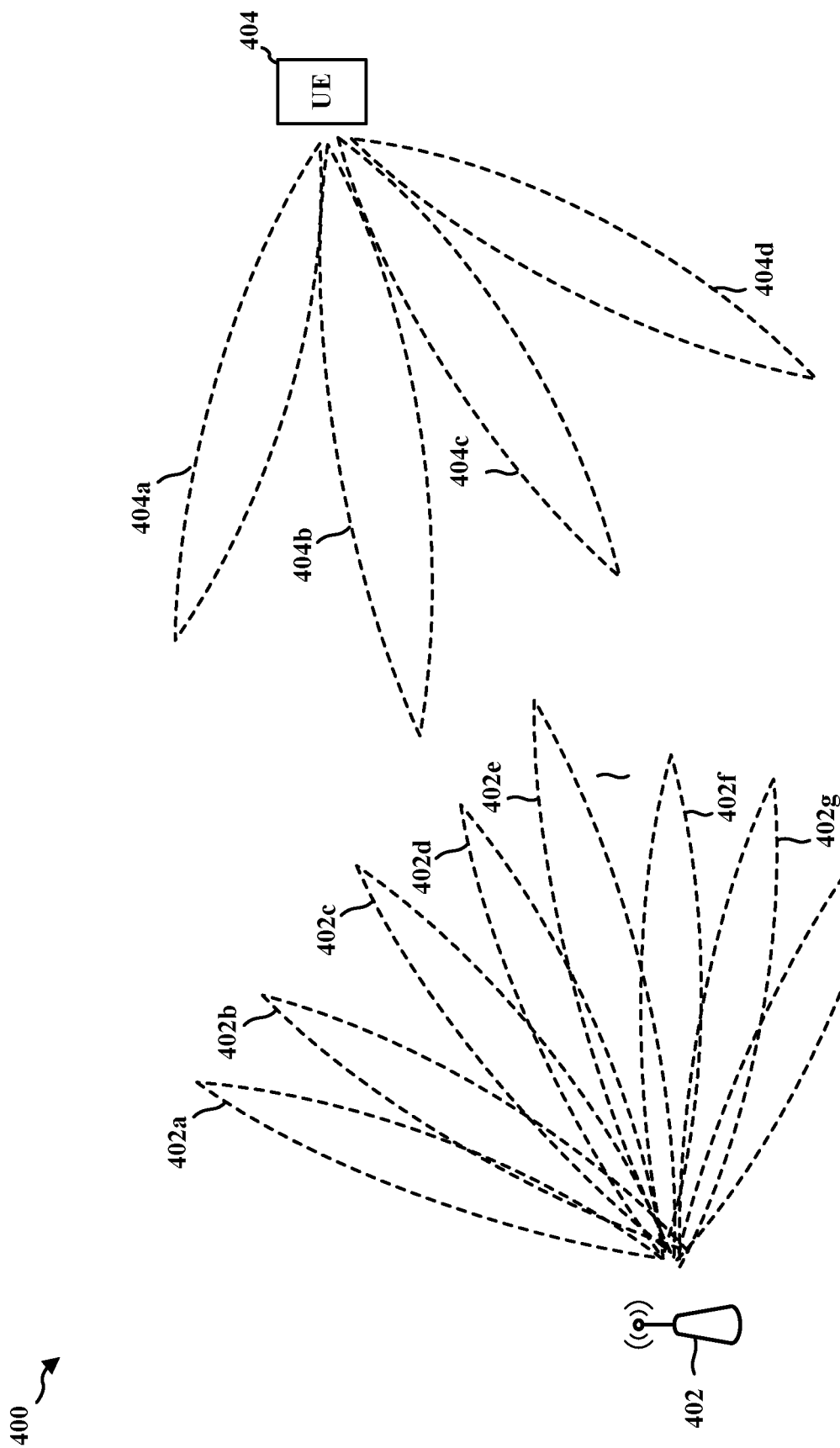
FIG. 4 is a diagram illustrating example communications between a base station and a UE for beamforming.

As described in connection with example 400 in FIG. 4, the base station 402 and UE 404 may communicate over active data/control beams both for DL communication and UL communication. The base station and/or UE may switch to a new beam direction using beam failure recovery procedures. Referring to FIG. 4, the base station 402 may transmit a beamformed signal to the UE 404 in one or more of the directions 402*a*, 402*b*, 402*c*, 402*d*, 402*e*, 402*f*, 402*g*, 402*h*. The UE 404 may receive the beamformed signal from the base station 402 in one or more receive directions 404*a*, 404*b*, 404*c*, 404*d*. The UE 404 may also transmit a beamformed signal to the base station 402 in one or more of the directions 404*a*-404*d*. The base station 402 may receive the beamformed signal from the UE 404 in one or more of the receive directions 402*a*-402*h*. The base station 402/UE 404 may perform beam training to determine the best receive and transmit directions for each of the base station 402/UE 404. The transmit and receive directions for the base station 402 may or may not be the same. The transmit and receive directions for the UE 404 may or may not be the same.

In response to different conditions, the UE 404 may determine to switch beams, e.g., between beams 402*a*-402*h*. The beam at the UE 404 may be used for reception of downlink communication and/or transmission of uplink communication. In some examples, the base station 402 may send a transmission that triggers a beam switch by the UE 404. For example, the base station 402 may indicate a transmission configuration indication (TCI) state change, and in response, the UE 404 may switch to a new beam for the new TCI state of the base station 402. In some instances, a UE may receive a signal, from a base station, configured to trigger a transmission configuration indication (TCI) state change via, for example, a MAC control element (CE) command. The TCI state change may cause the UE to find the best UE receive beam corresponding to the TCI state from the base station, and switch to such beam. Switching beams may allow for enhanced or improved connection between the UE and the base station by ensuring that the transmitter and receiver use the same configured set of beams for communication. In some aspects, a single MAC-CE command may be sent by the base station to trigger the changing of the TCI state on multiple CCs.

In another aspect, a spatial relation change, such as a spatial relation update, may trigger the UE to switch beams.

Beamforming may be applied to uplink channels, such as but not limited to PUCCH. Beamforming may be based on configuring one or more spatial relations between the uplink and downlink signals. Spatial relation indicates that a UE may transmit the uplink signal using the same beam as it used for receiving the corresponding downlink signal.

In another aspect, the base station 402 may change a pathloss reference signal configuration that the UE uses to determine power control for uplink transmissions, such as SRS, PUCCH, and/or PUSCH. In response to the change in the pathloss reference signal, the UE 404 may determine to switch to a new beam.

A UE may monitor the quality of the beams that it uses for communication with a base station. For example, a UE may monitor a quality of a signal received via reception beam(s). A beam failure detection (BFD) procedure may be used to identify problems in beam quality and a beam recovery procedure (BFR) may be used when a beam failure is detected. The BFD procedure may indicate whether a link for a particular beam is in-sync or out-of-sync, which may be referred to as a beam failure instance. For monitoring active link performances, a UE may perform measurements of at least one signal, e.g., reference signals (RS), for beam failure detection. The RS for BFD may be also referred to as BFD-RS. The measurements may include deriving a metric similar to a signal to noise and interference ratio (SINR) for the signal, or RSRP strength or block error rate (BLER) of a reference control channel chosen by base station and/or implicitly derived by UE based on the existing RRC configuration. The BFD-RS may include any of CSI-RS, a synchronization signal block (SSB), or other RS for time and/or frequency tracking, or the like. The UE may receive an indication of reference signal resources to be used to measure beam quality in connection with BFD. The UE may monitor the reference signal(s) and determine the signal quality, e.g., reference signal received power (RSRP) for the reference signal. In some cases, the UE may determine a configured metric such as block error rate (BLER) for a reference signal. The measurement(s) may indicate the UE's ability to decode a transmission, e.g., a DL control transmission from the base station.

Thresholds may be defined in tracking the radio link conditions, the threshold(s) may correspond to an RSRP, a BLER, etc. that indicates an in-sync condition and/or an out-of-sync condition of the radio link. An "out-of-sync" condition may indicate that the radio link condition is poor, and an "in-sync" condition may indicate that the radio link condition is acceptable, and the UE is likely to receive a transmission transmitted on the radio link. An Out-of-Sync condition may be declared when a block error rate for the radio link falls below a threshold over a specified time interval, e.g., a 200 ms time interval. The Out-of-Sync condition may also be referred to as a beam failure instance (BFI). The UE may determine a BFI indicator at every occasion of BFD-RS. An in-sync condition may be declared when a block error rate for the radio link is better than a threshold over a second, specified time interval, e.g., over 100 ms time interval.

The thresholds and time intervals used to determine the in-sync condition and out-of-sync condition may be the same or may be different from each other. If the UE receives a threshold number of consecutive out-of-sync measurements, which may be referred to as beam failure instances (BFIs) over a period of time, the UE may identify a beam failure detection (BFD) and may declare a beam failure to the network and accordingly initiate a beam failure recovery (BFR) procedure. The BFR procedure may include notifying the network about the beam failure and accordingly initiate a beam switching procedure via medium access control (MAC) control element (MAC-CE) or downlink control information (DCI) or beam recovery procedure via random access channel (RACH).

Figure 5:
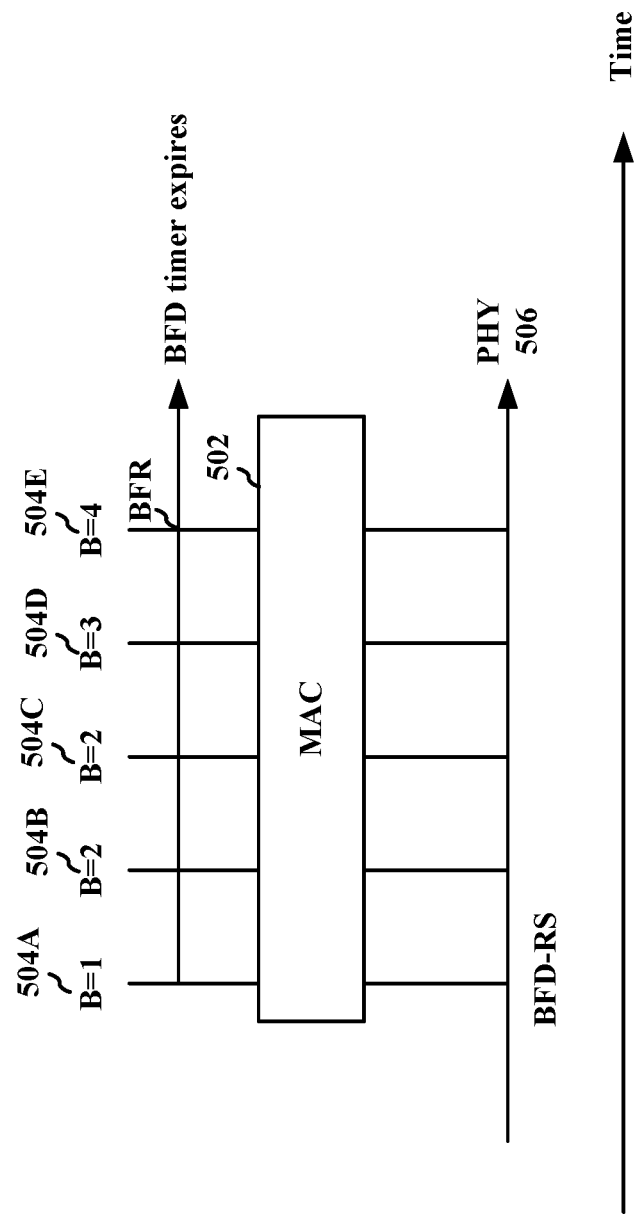
FIG. 5 is a diagram illustrating example aspects of a BFD and BFR procedure.

For example, FIG. 5 is a diagram 500 illustrating example aspects of a BFD and BFR procedure. A medium access control (MAC) entity 502 at a UE may receive BFD-RS from a physical (PHY) entity 506 at the UE. The BFD-RS may be transmitted from the network and received by the PHY entity 506 at the UE. Upon receiving a first BFD-RS 504A, the UE may identify whether BFI occurs based on the various measurements previously described. Upon identifying an occurrence of a BFI upon receiving the first BFD-RS 504A, the UE may initiate a BFD timer with a defined duration. The UE may keep identifying additional BFIs based on received BFD-RS 504B, 504C, 504D, and 504E. Over the period of time until the BFD timer with the defined duration expires, if a total BFI count reaches a threshold (e.g., a maxCount threshold), the UE may declare a beam failure and may accordingly initiate a BFR procedure. In the example illustrated in FIG. 5, the threshold may be 4. If the BFD timer expires before the total BFI count reaches the threshold, the UE may not declare beam failure and may reset BFI counts to zero and reset the BFD timer.

Figure 6:
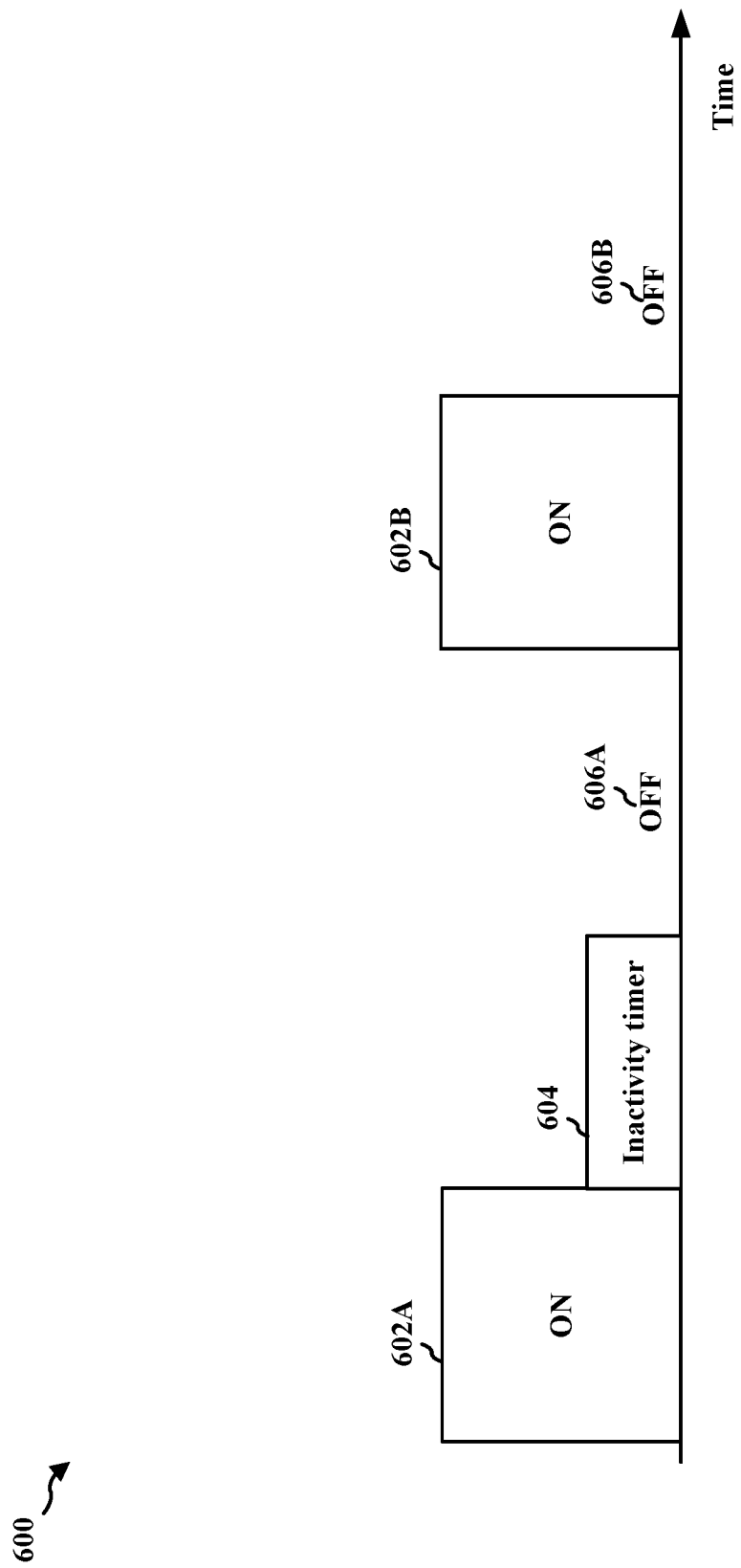
FIG. 6 is a diagram 600 illustrating a DRX mode.

A UE may be configured by a base station for discontinuation reception (DRX) mode to save power. In the DRX mode, the UE may be configured with periodic ON durations and OFF durations. The UE may monitor PDCCH during ON durations to identify if whether it will have downlink (DL)/uplink (UL) data. If the UE determines that it may have DL/UL data, the UE may stay awake for another amount of time, which may be defined based on an inactivity timer. If the UE identifies that it does not have DL/UL data, the UE may go to sleep and enter the OFF duration. During the OFF duration, the UE may skip monitoring for PDCCH, for example. For example, FIG. 6 is a diagram 600 illustrating a DRX mode. As illustrated in FIG. 6, the UE may enter a ON duration 602A and may accordingly monitor PDCCH during the ON duration 602A to identify if it may have DL/UL data or not. Based on identifying DL/UL data by monitoring PDCCH during the ON duration 602A, the UE may stay awake during an inactivity timer 604 to transmit/receive the DL/UL data, then the UE may enter an OFF duration 606A. Based on the period configured for the DRX mode, the UE may wake up again during the ON duration 602B and accordingly monitor PDCCH during the ON duration 602B to identify if it may have DL/UL data or not. Based on not identifying DL/UL data by monitoring PDCCH during the ON duration 602B, the UE may directly enter an OFF duration 606B.

As described above, DRX mode enables UE to monitor PDCCH during DRX ON, and go to sleep during DRX OFF. BFD and BFR may be based on PDCCH monitoring to determine beam failure. In some aspects, UEs may be able to predict beam failure autonomously (which may be based on assist of camera or other assisting devices) based on various algorithms (which may be machine learning based) or triggering events. If a UE predicts beam failure may occur during DRX OFF duration, the UE may not be able to take actions to address the beam failure. To provide better quality of service (QoS), aspects provided herein enable a UE to predict beam failures and accordingly extend a DRX ON duration to address predicted beam failures. In addition, aspects provided herein may provide signaling mechanisms for UE to efficiently notify the network when a DRX ON duration is extended. Aspects provided herein may improve BFD/BFR accuracy and allow more time of BFD-RS monitoring during DRX OFF duration to confirm beam failure. Aspects provided herein may also make BFD/BFR more timely because a UE may declare a beam failure during DRX OFF duration and initiate BFR immediately, e.g., during the DRX OFF duration or without waiting for the DRX ON duration. Overall, aspects provided herein may improve QoS and enhance beam connection consistency, reduce latency, and improve reliability.

Figure 7:
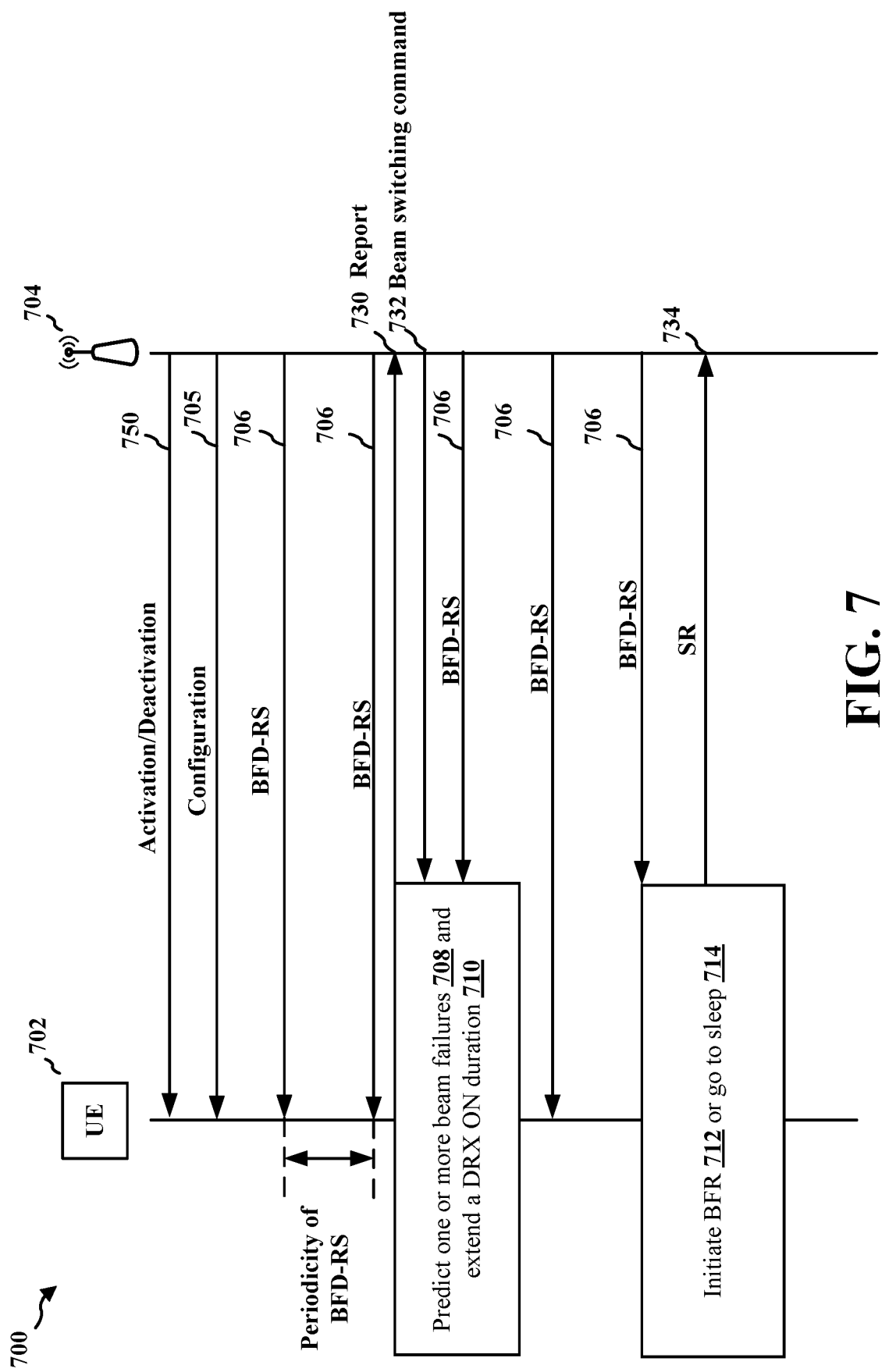
FIG. 7 is a diagram illustrating example communications between a UE and a network entity.

FIG. 7 is a diagram 700 illustrating example communications between a UE 702 and a network entity 704. The network entity 704 may be a network node. A network node may be implemented as an aggregated base station, as a disaggregated base station, an integrated access and backhaul (IAB) node, a relay node, a sidelink node, or the like. A network entity can be implemented in an aggregated or monolithic base station architecture, or alternatively, in a disaggregated base station architecture, and may include one or more of a CU, a DU, a RU, a Near-Real Time (Near-RT) RAN Intelligent Controller (RIC), or a Non-Real Time (Non-RT) RIC. As illustrated in FIG. 7, the UE 702 may periodically receive BFD-RS 706 from the network entity 704. Based on the BFD-RS 706, the UE 702 may predict one or more beam failures at 708. In some aspects, the UE 702 may predict one or more beam failures at 708 based on one or more prediction algorithms or one or more triggering events.

In some aspects, the one or more prediction algorithms may be configured by the network entity 704 (e.g., in configuration 705). In some aspects, the one or more prediction algorithms may be chosen by the UE 702 without network signaling. In some aspects, the one or more prediction algorithms may be machine learning based. In some aspects, the one or more prediction algorithms may be based on channel condition measurement such as SINR, RSRP, pathloss, or other measurements during the ON duration.

In some aspects, the one or more triggering events may be configured by the network entity 704 (e.g., in configuration 705). In some aspects, the one or more triggering events may be based on a BFI count being higher than a threshold that may be different from the maxCount threshold. In some aspects, the threshold may be defined based on the max-Count threshold. In some aspects, the one or more triggering events may be based on threshold that may be defined based on a number of consecutive BFIs for consecutive BFD-RS. In some aspects, the one or more triggering events may be based on a channel quality drop, such as SINR, RSRP, pathloss, or another measurement drop, by more than a threshold.

In some aspects, the one or more triggering events or the one or more prediction algorithms may be RRC configured. In some aspects, the configuration 705 may be transmitted via MAC-CE or DCI. In some aspects, multiple sets of triggering events or prediction algorithms may be configured. In some aspects, the network entity 704 may configure the UE with one set of triggering events or prediction algorithms by transmitting a MAC-CE or DCI (e.g., in the configuration 705).

In some aspects, based on the predicted beam failures, at 710, the UE 702 may extend a DRX ON duration as further illustrated in FIG. 8A. FIG. 8A is a diagram 800 illustrating example extending of DRX ON duration 802A by an extension of ON duration 802B upon predicting beam failure at 806 based on BFD-RS 804. In some aspects, the UE 702 may calculate a start time and a duration of the extension of ON duration 802B (e.g., represented by a ON_duration_extension parameter) time using one or more algorithms configured by the network entity 704 (e.g., in the configuration 705) or defined without network signaling. In some aspects, the one or more algorithms for extending calculating the start time and the duration of the extension of ON duration may be based on machine learning. In some aspects, the one or more algorithms for extending calculating the start time and the duration of the extension of ON duration may be based on a BFD-RS periodicity (e.g., periodicity of BFD-RS 706), a quality of service (QoS) specification, a UE power or capability associated with the UE 702, or the like. In some aspects, the UE 702 may be configured by the network entity 704 with a pool of algorithms (e.g., in configuration 705), and one algorithm may be chosen by the UE 702 without additional network signaling. In some aspects, multiple pools of algorithms may be configured and the network entity may use MAC-CE or DCI to switch between different pools of algorithms that the UE 702 may choose from.

After the UE 702 calculates the start time and the duration of the extension of ON duration, the UE 702 may keep monitoring BFD-RS during the extension of ON duration. For example, FIG. 8B is a diagram 830 illustrating example beam failure detected 838 after extending DRX ON duration 832A by an extension of ON duration 832B upon predicting beam failure at 836 based on BFD-RS 834. In some aspects, if a beam failure is detected during the extension of ON duration, the UE 702 may accordingly initiate BFR (e.g., at 712) by transmitting a scheduling request (SR) 734 to request a beam switch. In some aspects, if the beam failure is detected during the extension of the ON duration, the UE 702 may accordingly initiate RACH for BFR and the DRX mode may be overridden by the RACH procedure. In another example, FIG. 8C is a diagram 850 illustrating an example in which a beam failure is not detected 858 after extending DRX ON duration 852A by an extension of ON duration 852B in response to predicting beam failure at 856 based on BFD-RS 854. Based on not detecting the beam failure, the UE 702 may go to sleep (e.g., at 714) and enter a DRX OFF duration 852C and ignore the rest of the calculated extension of the ON duration.

In some aspects, the network entity 704 may activate or deactivate the DRX ON duration extension feature for the UE 702. For example, the network entity 704 may activate or deactivate the DRX ON duration extension feature for the UE 702 by transmitting an activation/deactivation 750 to the UE 702. In some aspects, the activation/deactivation 750 may be transmitted to the UE 702 via MAC-CE or DCI. In some aspects, the network entity 704 may determine whether to transmit the activation/deactivation 750 based on one or more of: a UE autonomy capability associated with the UE 702, a QoS specification associated with the UE 702, DRX configuration associated with the UE 702 (e.g., DRX cycle length, periodicity, length of ON or OFF duration, or the like), power/capability associated with the UE 702, or the like.

In some aspects, the UE 702 may transmit a report (e.g., 730 in FIG. 7, or in signaling 808 in FIG. 8A) to the network entity 704 to report the extension of ON duration. In some aspects, the report 730 may include a notification associated with extending the DRX ON duration. In some aspects, the report 730 may include a calculated start time and a duration of the extension of ON duration 802B. In some aspects, the report 730 may include a current BFD status. For example, the current BFD status may include a current BFI count, one or more past BFD-RS measurements or statistics related to one or more past BFD-RS measurements, or the like. In some aspects, the report 730 may include a beam failure warning report that may serve as a heads-up message to the network entity 704 regarding potential beam failure in the near future. In some aspects, the report 730 may be transmitted via uplink control information (UCI) or MAC-CE.

In some aspects, upon receiving the report 730, the network entity 704 may initiate beam switching for the UE 702 to prevent beam failure. In some aspects, such beam switching may be faster than BFR via RACH. In some aspects, the network entity 704 may initiate beam switching for the UE 702 by transmitting a beam switching command 732. In some aspects, the beam switching command 732 may be transmitted via DCI or MAC-CE. In some aspects, the network entity 704 may also schedule more data transmission to UE during the extension of ON duration 802B to increase data throughput and improve QoS. In some aspects, based on the report 730, the network entity 704 may calculate a best beam for the UE 702 and transmit the beam switching command 732 based on the calculated best beam.

In some aspects, format, structure, or content of the report 730 may be configured by RRC. In some aspects, format, structure, or content of the report 730 may be configured by the network entity 704 via MAC-CE or DCI. In some aspects, the DCI or MAC-CE carrying the activation/deactivation 750 may also configure the format, structure, or content of the report 730. In some aspects, multiple formats, structures, or content of the report 730 may be configured.

Figure 9:
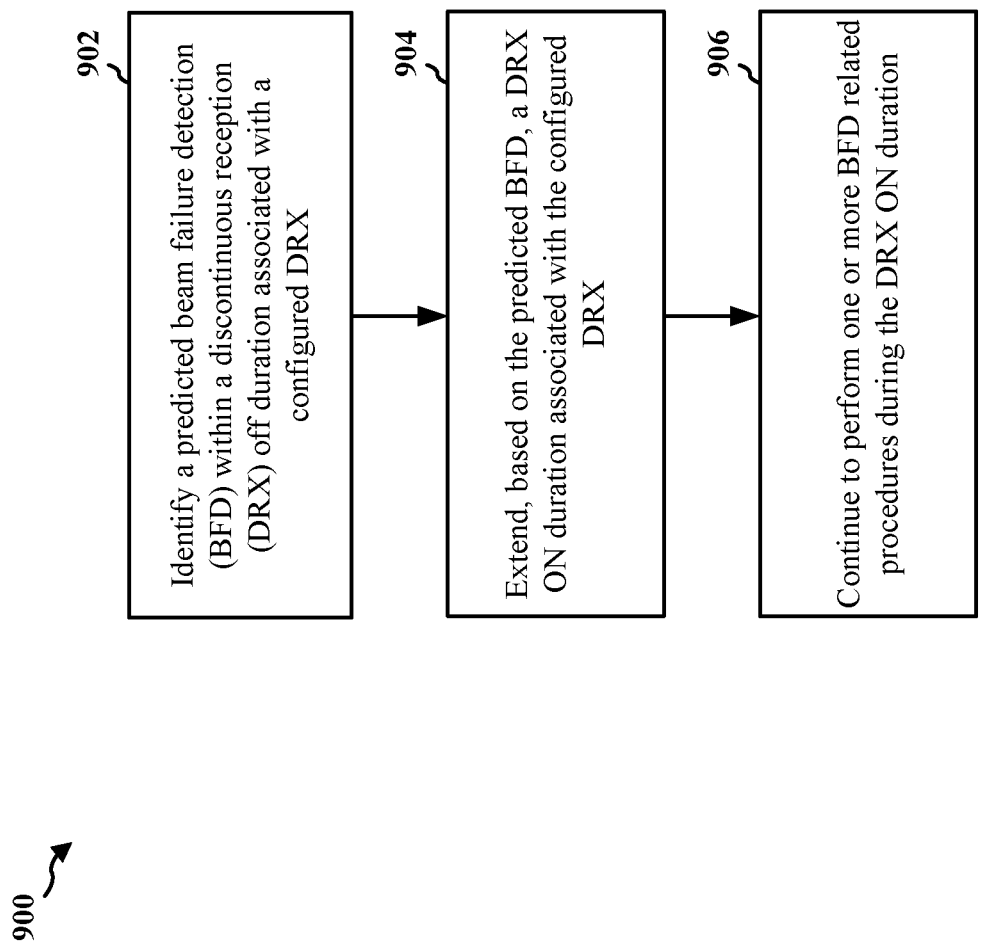
FIG. 9 is a flowchart of a method of wireless communication.

FIG. 9 is a flowchart 900 of a method of wireless communication. The method may be performed by a UE (e.g., the UE 104, the UE 702; the apparatus 1104).

At 902, the UE may identify a predicted BFD within a DRX OFF duration associated with a configured DRX. For example, the UE 702 may identify a predicted BFD within a DRX OFF duration associated with a configured DRX at 708. In some aspects, the UE may receive, from a network entity via MAC-CE or DCI, an activation or a deactivation associated with extending the DRX ON duration based on the predicted BFD. In some aspects, the activation or the deactivation ma be based on one or more of: a QoS specification, a DRX configuration associated with the configured DRX, or a power or a capability associated with the UE. In some aspects, the UE may receive, from a network entity, an activation or a deactivation for a report of a DRX ON duration extension based on the predicted BFD. In some aspects, the UE may transmit, to a network entity, a request for an activation or a deactivation of a report of a DRX ON duration extension based on the predicted BFD.

At 904, the UE may extend, based on the predicted BFD, a DRX ON duration associated with the configured DRX. For example, the UE 702 may extend, based on the predicted BFD, a DRX ON duration associated with the configured DRX at 710. In some aspects, the UE may receive a configuration (e.g., configuration 705) of one or more prediction algorithms from a network entity via MAC-CE or DCI, the predicted BFD may be identified based on the one or more prediction algorithms. In some aspects, the predicted BFD may be identified based on one or more prediction algorithms defined independent of signaling from a network entity. In some aspects, the predicted BFD is identified based on one or more prediction algorithms, which are based on a history of one or more channel condition measurements including one or more of: a SINR measurement, a RSRP measurement, or a pathloss measurement.

In some aspects, the UE may receive an indication of one or more triggering events from a network entity, the predicted BFD may be identified based on the one or triggering events. In some aspects, the one or more triggering events may be based on a BFI count over a period of time being higher than a threshold. In some aspects, the one or more triggering events may be based on a consecutive BFI count being higher than a threshold. In some aspects, the one or more triggering events may be based on a channel quality measurement drop higher than a decibel (dB) threshold. In some aspects, the UE may receive an RRC configuration with multiple prediction algorithms or multiple parameters for a triggering event. In some aspects, the UE may receive an activation of one of the multiple prediction algorithms or one of the multiple parameters for the triggering event, where the predicted BFD is based on the one of the multiple prediction algorithms or the one of the multiple parameters for the triggering event activated for the UE. In some aspects, to extend the DRX ON duration, the UE may calculate a start time and an extension duration of the DRX ON duration based on an extension algorithm. In some aspects, the extension algorithm is configured by a network entity or independent of the network entity. In some aspects, where the extension algorithm is based on a BFD-RS periodicity, a QoS specification, or a power or a capability associated with the UE. In some aspects, the extension algorithm is chosen from a pool of candidate extension algorithm configured by a network entity via MAC-CE or DCI.

At 906, the UE may continue to perform one or more BFD related procedures during the DRX ON duration. For example, the one or more BFD related procedure may include monitoring a PDCCH for BFD-RS. In some aspects, the one or more BFD related procedure may include measuring subsequent BFD-RS (e.g., 706), initiate BFR (e.g., at 712) after detecting beam failure, or go to sleep (at 714) after not detecting beam failure. In some aspects, the one or more BFD related procedures may include detecting a beam failure during the DRX ON duration and responsive to the beam failure, initiating a SR to request for beam switching or initiate a random access procedure. In some aspects, the one or more BFD related procedures may include switch to a sleep mode or DRX OFF mode based on not detecting a beam failure upon expiration of a beam failure detection timer. In some aspects, the one or more BFD related procedures may include transmitting, to a network entity via MAC-CE or UCI, a request to activate or a deactivate extension of the DRX ON duration based on the predicted BFD. In some aspects, the request may be based on one or more of: a QoS specification, a DRX configuration associated with the configured DRX, or a power or a capability associated with the UE. In some aspects, the UE may transmit, to a network entity, a report indicating that the UE extends the DRX ON duration in response to the predicted BFD (e.g., as part of the one or more BFD related procedures). In some aspects, the report may include one or more of an extension duration for the DRX ON duration, a current beam failure detection status including one or more BFI counts and one or more BFD-RS measurement conditions, or a beam failure warning report representing the predicted BFD. In some aspects, the report may be transmitted via MAC-CE or UCI. In some aspects, the one or more BFD related procedures may include receiving, from the network entity and based on the report, a beam switching command for initiating a beam switching procedure. In some aspects, the beam switching command may be received via MAC-CE or DCI. In some aspects, the UE may receive, from a network entity, scheduling of one or more data transmissions during the DRX ON duration.

Figure 10:
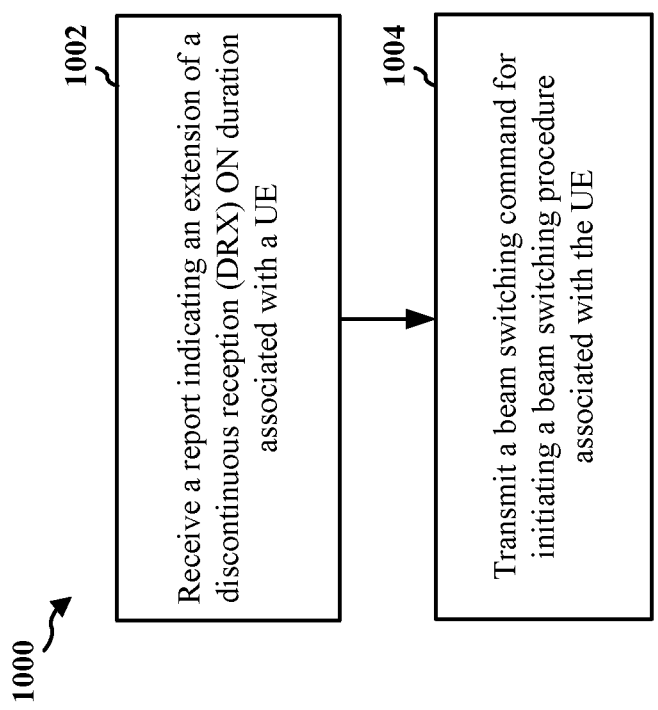
FIG. 10 is a flowchart of a method of wireless communication.

FIG. 10 is a flowchart 1000 of a method of wireless communication. The method may be performed by a network entity (e.g., the base station 102; the network entity 1102).

At 1002, the network entity may receive a report indicating an extension of a DRX ON duration associated with a UE. For example, the network entity 704 may receive a report 730 indicating an extension of a DRX ON duration associated with a UE.

At 1004, the network entity may transmit a beam switching command for initiating a beam switching procedure associated with the UE. For example, the network entity 704 may transmit a beam switching command 732 for initiating a beam switching procedure associated with the UE.

Figure 11:
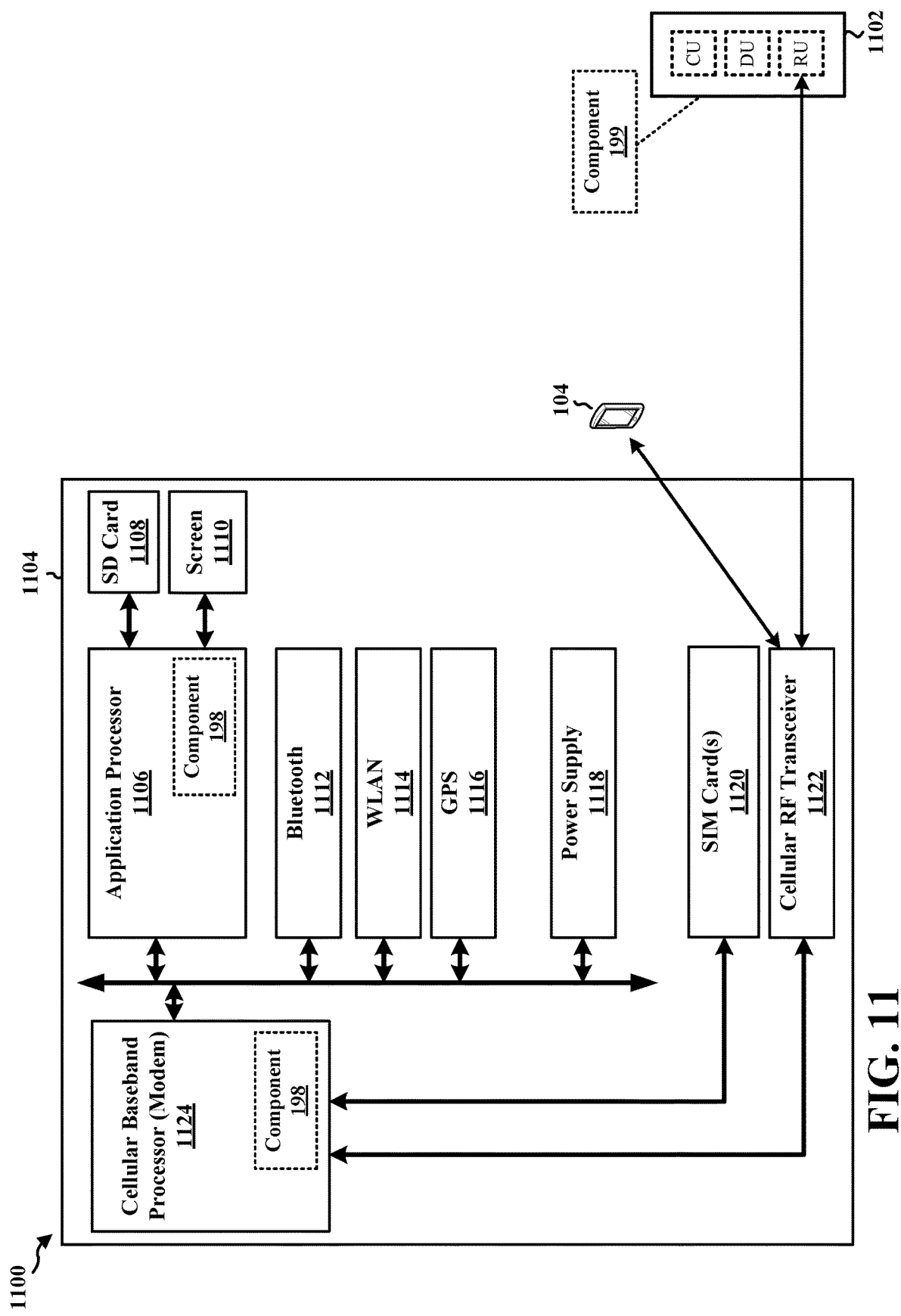
FIG. 11 is a diagram illustrating an example of a hardware implementation for an example apparatus.

FIG. 11 is a diagram 1100 illustrating an example of a hardware implementation for an apparatus 1104 and a network entity 1102. The apparatus 1104 may be a UE, a component of a UE, or may implement UE functionality. The network entity 1102 may be a BS, a component of a BS, or may implement BS functionality. In some aspects, the apparatus 1104 may include a cellular baseband processor 1124 (also referred to as a modem) coupled to a cellular RF transceiver 1122. In some aspects, the apparatus 1104 may further include one or more subscriber identity modules (SIM) cards 1120, an application processor 1106 coupled to a secure digital (SD) card 1108 and a screen 1110, a Bluetooth module 1112, a wireless local area network (WLAN) module 1114, a Global Positioning System (GPS) module 1116, or a power supply 1118. The cellular baseband processor 1124 communicates through the cellular RF transceiver 1122 with the UE 104 and/or with an RU associated with the network entity 1102. The RU is either part of the network entity 1102 or is in communication with the network entity 1102. The network entity 1102 may include one or more of the CU, DU, and the RU. The cellular baseband processor 1124 and the application processor 1106 may each include a computer-readable medium/memory. Each computer-readable medium/memory may be non-transitory. The cellular baseband processor 1124 and the application processor 1106 are each responsible for general processing, including the execution of software stored on the computer-readable medium/memory. The software, when executed by the cellular baseband processor 1124/application processor 1106, causes the cellular baseband processor 1124/application processor 1106 to perform the various functions described supra. The computer-readable medium/memory may also be used for storing data that is manipulated by the cellular baseband processor 1124/application processor 1106 when executing software. The cellular baseband processor 1124/application processor 1106 may be a component of the UE 350 and may include the memory 360 and/or at least one of the TX processor 368, the RX processor 356, and the controller/processor 359. In one configuration, the apparatus 1104 may be a processor chip (modem and/or application) and include just the cellular baseband processor 1124 and/or the application processor 1106, and in another configuration, the apparatus 1104 may be the entire UE (e.g., see 350 of FIG. 3) and include the additional modules of the apparatus 1104.

As discussed supra, the DRX component 198 may be configured to identify a predicted beam failure detection (BFD) within a discontinuous reception (DRX) OFF duration associated with a configured DRX. In some aspects, the DRX component 198 may be further configured to extend, based on the predicted BFD, a DRX ON duration associated with the configured DRX. In some aspects, the DRX component 198 may be further configured to continue to perform one or more BFD related procedures during the DRX ON duration.

The DRX component 198 may be within the cellular baseband processor 1124, the application processor 1106, or both the cellular baseband processor 1124 and the application processor 1106. The DRX component 198 may be one or more hardware components specifically configured to carry out the stated processes/algorithm, implemented by one or more processors configured to perform the stated processes/algorithm, stored within a computer-readable medium for implementation by one or more processors, or some combination thereof. As shown, the apparatus 1104 may include a variety of components configured for various functions. In one configuration, the apparatus 1104, and in particular the cellular baseband processor 1124 and/or the application processor 1106, includes means for identifying a predicted BFD within a DRX OFF duration associated with a configured DRX. In some aspects, the cellular baseband processor 1124 and/or the application processor 1106 may include means for extending, based on the predicted BFD, a DRX ON duration associated with the configured DRX. In some aspects, the cellular baseband processor 1124 and/or the application processor 1106 may include means for continuing to perform one or more BFD related procedures during the DRX ON duration. In some aspects, the cellular baseband processor 1124 and/or the application processor 1106 may include means for receiving a configuration of one or more prediction algorithms from a network entity via MAC-CE or DCI, the predicted BFD being identified based on the one or more prediction algorithms. In some aspects, the cellular baseband processor 1124 and/or the application processor 1106 may include means for receiving an indication of one or more triggering events from a network entity, the predicted BFD being identified based on the one or triggering events. In some aspects, the cellular baseband processor 1124 and/or the application processor 1106 may include means for receiving an RRC configuration with multiple prediction algorithms or multiple parameters for a triggering event. In some aspects, the cellular baseband processor 1124 and/or the application processor 1106 may include means for receiving an activation of one of the multiple prediction algorithms or one of the multiple parameters for the triggering event, where the predicted BFD is based on the one of the multiple prediction algorithms or the one of the multiple parameters for the triggering event activated for the UE. In some aspects, the cellular baseband processor 1124 and/or the application processor 1106 may include means for calculating a start time and an extension duration of the DRX ON duration based on an extension algorithm. In some aspects, the cellular baseband processor 1124 and/or the application processor 1106 may include means for detecting a beam failure during the DRX ON duration. In some aspects, the cellular baseband processor 1124 and/or the application processor 1106 may include means for responsive to the beam failure, initiating an SR to request for beam switching or initiate a random access procedure. In some aspects, the cellular baseband processor 1124 and/or the application processor 1106 may include means for switching to a sleep mode or DRX OFF mode based on not detecting a beam failure upon expiration of a beam failure detection timer. In some aspects, the cellular baseband processor 1124 and/or the application processor 1106 may include means for receiving, from a network entity via MAC-CE or DCI, an activation or a deactivation associated with extending the DRX ON duration based on the predicted BFD. In some aspects, the cellular baseband processor 1124 and/or the application processor 1106 may include means for transmitting, to a network entity via MAC-CE or UCI, a request to activate or a deactivate extension of the DRX ON duration based on the predicted BFD. In some aspects, the cellular baseband processor 1124 and/or the application processor 1106 may include means for transmitting, to a network entity, a report indicating that the UE extends the DRX ON duration in response to the predicted BFD. In some aspects, the cellular baseband processor 1124 and/or the application processor 1106 may include means for receiving, from the network entity and based on the report, a beam switching command for initiating a beam switching procedure. In some aspects, the cellular baseband processor 1124 and/or the application processor 1106 may include means for receiving, from a network entity, scheduling of one or more data transmissions during the DRX ON duration. In some aspects, the cellular baseband processor 1124 and/or the application processor 1106 may include means for receiving, from a network entity, an activation or a deactivation for a report of a DRX ON duration extension based on the predicted BFD. In some aspects, the cellular baseband processor 1124 and/or the application processor 1106 may include means for transmitting, to a network entity, a request for an activation or a deactivation of a report of a DRX ON duration extension based on the predicted BFD.

The means may be the DRX component 198 of the apparatus 1104 configured to perform the functions recited by the means. As described supra, the apparatus 1104 may include the TX Processor 368, the RX Processor 356, and the controller/processor 359. As such, in one configuration, the means may be the TX Processor 368, the RX Processor 356, and/or the controller/processor 359 configured to perform the functions recited by the means.

As discussed supra, in some aspects, the DRX component 199 may be configured to receive a report indicating an extension of a DRX ON duration associated with a UE. In some aspects, the DRX component 199 may be further configured to transmit a beam switching command for initiating a beam switching procedure associated with the UE. The DRX component 199 may be within one or more processors (e.g., BBU(s)) of one or more of the CU, DU, and the RU. The DRX component 199 may be one or more hardware components specifically configured to carry out the stated processes/algorithm, implemented by one or more processors configured to perform the stated processes/algorithm, stored within a computer-readable medium for implementation by one or more processors, or some combination thereof. The network entity 1102 may include a variety of components configured for various functions. In one configuration, the network entity 1102 includes means for receiving a report indicating an extension of a DRX ON duration associated with a UE. In some aspects, the network entity 1102 may further include means for transmitting a beam switching command for initiating a beam switching procedure associated with the UE. The means may be the DRX component 199 of the network entity 1102 configured to perform the functions recited by the means. As described supra, the network entity 1102 may include the TX Processor 316, the RX Processor 370, and the controller/processor 375. As such, in one configuration, the means may be the TX Processor 316, the RX Processor 370, and/or the controller/processor 375 configured to perform the functions recited by the means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not limited to the aspects described herein, but are to be accorded the full scope consistent with the language claims. Reference to an element in the singular does not mean "one and only one" unless specifically so stated, but rather "one or more." Terms such as "if," "when," and "while" do not imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. Sets should be interpreted as a set of elements where the elements number one or more. Accordingly, for a set of X, X would include one or more elements. If a first apparatus receives data from or transmits data to a second apparatus, the data may be received/transmitted directly between the first and second apparatuses, or indirectly between the first and second apparatuses through a set of apparatuses. All structural and functional equivalents to the elements of the various aspects described throughout this disclosure that are known or later come to be known to those of ordinary skill in the art are expressly incorporated herein by reference and are encompassed by the claims. Moreover, nothing disclosed herein is dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

As used in this disclosure outside of the claims, the phrase "based on" is inclusive of all interpretations and shall not be limited to any single interpretation unless specifically recited or indicated as such. For example, the phrase "based on A" (where "A" may be information, a condition, a factor, or the like) may be interpreted as: "based at least on A," "based in part on A," "based at least in part on A," "based only on A," or "based solely on A." Accordingly, as disclosed herein, "based on A" may, in one aspect, refer to "based at least on A." In another aspect, "based on A" may refer to "based in part on A." In another aspect, "based on A" may refer to "based at least in part on A." In another aspect, "based on A" may refer to "based only on A." In another aspect, "based on A" may refer to "based solely on A." In another aspect, "based on A" may refer to any combination of interpretations in the alternative. As used in the claims, the phrase "based on A" shall be interpreted as "based at least on A" unless specifically recited differently.

The following aspects are illustrative only and may be combined with other aspects or teachings described herein, without limitation.

Aspect 1 is a method for communication at a user equipment (UE), including: identifying a predicted beam failure detection (BFD) within a discontinuous reception (DRX) OFF duration associated with a configured DRX; extending, based on the predicted BFD, a DRX ON duration associated with the configured DRX; and continuing to perform one or more BFD related procedures during the DRX ON duration.

Aspect 2 is the method of aspect 1, further comprising: receiving a configuration of one or more prediction algorithms from a network entity via medium access control (MAC) control element (MAC-CE) or downlink control information (DCI), the predicted BFD being identified based on the one or more prediction algorithms.

Aspect 3 is the method of any of aspects 1-2, where the predicted BFD is identified based on one or more prediction algorithms defined independent of signaling from a network entity.

Aspect 4 is the method of any of aspects 1-2, where the predicted BFD is identified based on one or more prediction algorithms, which are based on a history of one or more channel condition measurements including one or more of: a signal to noise and interference ratio (SINR) measurement, a reference signal received power (RSRP) measurement, or a pathloss measurement.

Aspect 5 is the method of aspect 1-4, further comprising: receiving an indication of one or more triggering events from a network entity, the predicted BFD being identified based on the one or triggering events.

Aspect 6 is the method of any of aspects 1-5, where the one or more triggering events are based on a beam failure instance (BFI) count over a period of time being higher than a threshold.

Aspect 7 is the method of any of aspects 1-6, where the one or more triggering events are based on a consecutive beam failure instance (BFI) count being higher than a threshold.

Aspect 8 is the method of any of aspects 1-7, where the one or more triggering events are based on a channel quality measurement drop higher than a decibel (dB) threshold.

Aspect 9 is the method of any of aspects 1-8, further comprising: receiving a radio resource control (RRC) configuration with multiple prediction algorithms or multiple parameters for a triggering event; and receiving an activation of one of the multiple prediction algorithms or one of the multiple parameters for the triggering event, where the predicted BFD is based on the one of the multiple prediction algorithms or the one of the multiple parameters for the triggering event activated for the UE.

Aspect 10 is the method of any of aspects 1-9, where to extend the DRX ON duration, the at least one processor is further configured to: calculating a start time and an extension duration of the DRX ON duration based on an extension algorithm.

Aspect 11 is the method of any of aspects 1-10, where the extension algorithm is configured by a network entity or independent of the network entity.

Aspect 12 is the method of any of aspects 1-11, where the extension algorithm is based on a beam failure detection (BFD) reference signal (BFD-RS) periodicity, a quality of service (QoS) specification, or a power or a capability associated with the UE.

Aspect 13 is the method of any of aspects 1-12, where the extension algorithm is chosen from a pool of candidate extension algorithm configured by a network entity via medium access control (MAC) control element (MAC-CE) or downlink control information (DCI).

Aspect 14 is the method of any of aspects 1-13, where the one or more BFD related procedures include: detecting a beam failure during the DRX ON duration; and responsive to the beam failure, initiating a scheduling request (SR) to request for beam switching or initiate a random access procedure.

Aspect 15 is the method of any of aspects 1-14, further comprising: switching to a sleep mode or DRX OFF mode based on not detecting a beam failure upon expiration of a beam failure detection timer.

Aspect 16 is the method of any of aspects 1-15, further comprising: receiving, from a network entity via medium access control (MAC) control element (MAC-CE) or downlink control information (DCI), an activation or a deactivation associated with extending the DRX ON duration based on the predicted BFD.

Aspect 17 is the method of any of aspects 1-16, where the activation or the deactivation is based on one or more of: a quality of service (QoS) specification, a DRX configuration associated with the configured DRX, or a power or a capability associated with the UE.

Aspect 18 is the method of any of aspects 1-17, where the one or more BFD related procedures include: transmitting, to a network entity via medium access control (MAC) control element (MAC-CE) or uplink control information (UCI), a request to activate or a deactivate extension of the DRX ON duration based on the predicted BFD.

Aspect 19 is the method of any of aspects 1-18, where the request is based on one or more of: a quality of service (QoS) specification, a DRX configuration associated with the configured DRX, or a power or a capability associated with the UE.

Aspect 20 is the method of any of aspects 1-19, further comprising: transmitting, to a network entity, a report indicating that the UE extends the DRX ON duration in response to the predicted BFD.

Aspect 21 is the method of any of aspects 1-20, where the report includes one or more of: an extension duration for the DRX ON duration, a current beam failure detection status including one or more beam failure instance (BFI) counts and one or more beam failure detection (BFD) reference signal (BFD-RS) measurement conditions, or a beam failure warning report representing the predicted BFD.

Aspect 22 is the method of any of aspects 1-21, where the report is transmitted via medium access control (MAC) control element (MAC-CE) or uplink control information (UCI).

Aspect 23 is the method of any of aspects 1-22, where the one or more BFD related procedures include: receiving, from the network entity and based on the report, a beam switching command for initiating a beam switching procedure.

Aspect 24 is the method of any of aspects 1-23, where the beam switching command is received via medium access control (MAC) control element (MAC-CE) or downlink control information (DCI).

Aspect 25 is the method of any of aspects 1-24, further comprising: receiving, from a network entity, scheduling of one or more data transmissions during the DRX ON duration.

Aspect 26 is the method of any of aspects 1-25, further comprising: receiving, from a network entity, an activation or a deactivation for a report of a DRX ON duration extension based on the predicted BFD.

Aspect 27 is the method of any of aspects 1-26, further comprising: transmitting, to a network entity, a request for an activation or a deactivation of a report of a DRX ON duration extension based on the predicted BFD.

Aspect 28 is a method for communication at a network node, comprising: receiving a report indicating an extension of a discontinuous reception (DRX) ON duration associated with a UE; and transmitting a beam switching command for initiating a beam switching procedure associated with the UE.

Aspect 29 is an apparatus for wireless communication at a UE including a memory and at least one processor coupled to the memory and, based at least in part on information stored in the memory, configured to perform a method in accordance with any of aspects 1-27. The apparatus may include at least one of a transceiver or an antenna coupled to the at least one processor.

Aspect 30 is an apparatus for wireless communications, including means for performing a method in accordance with any of aspects 1-27.

Aspect 31 is a non-transitory computer-readable medium including instructions that, when executed by an apparatus, cause the apparatus to perform a method in accordance with any of aspects 1-27.

Aspect 32 is an apparatus for wireless communication at a network entity including a memory and at least one processor coupled to the memory and, based at least in part on information stored in the memory, configured to perform a method in accordance with any of aspects 15-28. The apparatus may include at least one of a transceiver or an antenna coupled to the at least one processor.

Aspect 33 is an apparatus for wireless communications, including means for performing a method in accordance with aspect 28.

Aspect 34 is a non-transitory computer-readable medium including instructions that, when executed by an apparatus, cause the apparatus to perform a method in accordance with aspect 28.

What is claimed is:

1. An apparatus for communication at a user equipment (UE), comprising:
    memory; and
    at least one processor coupled to the memory and, based at least in part on information stored in the memory, configured to:
        identify a predicted beam failure detection (BFD) that is predicted within a future discontinuous reception (DRX) OFF duration associated with a configured DRX;
        extend, based on the predicted BFD and without reception of network signaling to extend a DRX ON duration, the DRX ON duration associated with the configured DRX for an extension duration, wherein the extension duration is based on a BFD-reference signal (BFD-RS) periodicity; and
        continue to perform one or more BFD related procedures during the DRX ON duration.

2. The apparatus of claim 1, wherein the at least one processor is further configured to:
    receive a configuration of one or more prediction algorithms from a network entity via medium access control (MAC) control element (MAC-CE) or downlink control information (DCI), the predicted BFD being identified based on the one or more prediction algorithms.

3. The apparatus of claim 1, wherein the predicted BFD is identified based on one or more prediction algorithms defined independent of signaling from a network entity.

4. The apparatus of claim 1, wherein the predicted BFD is identified based on one or more prediction algorithms, which are based on a history of one or more channel condition measurements comprising one or more of: a signal to noise and interference ratio (SINR) measurement, a reference signal received power (RSRP) measurement, or a pathloss measurement.

5. The apparatus of claim 1, wherein the at least one processor is further configured to:
    receive an indication of one or more triggering events from a network entity, the predicted BFD being identified based on the one or more triggering events.

6. The apparatus of claim 5, wherein the one or more triggering events are based on a beam failure instance (BFI) count over a period of time being higher than a threshold.

7. The apparatus of claim 5, wherein the one or more triggering events are based on a consecutive beam failure instance (BFI) count being higher than a threshold.

8. The apparatus of claim 5, wherein the one or more triggering events are based on a channel quality measurement drop higher than a decibel (dB) threshold.

9. The apparatus of claim 5, wherein the at least one processor is further configured to:
    receive a radio resource control (RRC) configuration with multiple prediction algorithms or multiple parameters for a triggering event; and
    receive an activation of one of the multiple prediction algorithms or one of the multiple parameters for the triggering event, wherein the predicted BFD is based on the one of the multiple prediction algorithms or the one of the multiple parameters for the triggering event activated for the UE.

10. The apparatus of claim 1, wherein to extend the DRX ON duration, the at least one processor is further configured to:
    calculate a start time and the extension duration of the DRX ON duration based on an extension algorithm.

11. The apparatus of claim 10, wherein the extension algorithm is configured by a network entity or independent of the network entity.

12. The apparatus of claim 10, wherein the extension algorithm is based on the BFD-RS periodicity, a quality of service (QOS) specification, or a power or a capability associated with the UE.

13. The apparatus of claim 10, wherein the extension algorithm is chosen from a pool of candidate extension algorithms configured by a network entity via medium access control (MAC) control element (MAC-CE) or downlink control information (DCI).

14. The apparatus of claim 1, wherein the one or more BFD related procedures comprise:
    detecting a beam failure during the DRX ON duration; and
    responsive to the beam failure, initiating a scheduling request (SR) to request for beam switching or initiate a random access procedure.

15. The apparatus of claim 1, wherein the at least one processor is further configured to:
switch to a sleep mode or DRX OFF mode based on not detecting a beam failure upon expiration of a beam failure detection timer.

16. The apparatus of claim 1, wherein the at least one processor is further configured to:
receive, from a network entity via medium access control (MAC) control element (MAC-CE) or downlink control information (DCI), an activation or a deactivation associated with extending the DRX ON duration based on the predicted BFD.

17. The apparatus of claim 16, wherein the activation or the deactivation is based on one or more of: a quality of service (QOS) specification, a DRX configuration associated with the configured DRX, or a power or a capability associated with the UE.

18. The apparatus of claim 1, wherein the one or more BFD related procedures comprise:
transmitting, to a network entity via medium access control (MAC) control element (MAC-CE) or uplink control information (UCI), a request to activate or a deactivate extension of the DRX ON duration based on the predicted BFD.

19. The apparatus of claim 18, wherein the request is based on one or more of: a quality of service (QOS) specification, a DRX configuration associated with the configured DRX, or a power or a capability associated with the UE.

20. The apparatus of claim 1, wherein the at least one processor is further configured to:
transmit, to a network entity, a report indicating that the UE extends the DRX ON duration in response to the predicted BFD.

21. The apparatus of claim 20, wherein the report comprises one or more of:
the extension duration for the DRX ON duration,
a current beam failure detection status comprising one or more beam failure instance (BFI) counts and one or more beam failure detection (BFD) reference signal (BFD-RS) measurement conditions, or
a beam failure warning report representing the predicted BFD.

22. The apparatus of claim 20, wherein the report is transmitted via medium access control (MAC) control element (MAC-CE) or uplink control information (UCI).

23. The apparatus of claim 20, wherein the one or more BFD related procedures comprise:
receive, from the network entity and based on the report, a beam switching command for initiating a beam switching procedure.

24. The apparatus of claim 23, wherein the beam switching command is received via medium access control (MAC) control element (MAC-CE) or downlink control information (DCI).

25. The apparatus of claim 1, wherein the at least one processor is further configured to:
receive, from a network entity, scheduling of one or more data transmissions during the DRX ON duration.

26. The apparatus of claim 1, wherein the at least one processor is further configured to:
receive, from a network entity, an activation or a deactivation for a report of a DRX ON duration extension based on the predicted BFD.

27. The apparatus of claim 1, wherein the at least one processor is further configured to:
transmit, to a network entity, a request for an activation or a deactivation of a report of a DRX ON duration extension based on the predicted BFD.

28. The apparatus of claim 1, further comprising at least one transceiver or an antenna coupled to the at least one processor.

29. An apparatus for communication at a network node, comprising:
memory; and
at least one processor coupled to the memory and, based at least in part on information stored in the memory, configured to:
receive a report indicating an autonomous extension of a discontinuous reception (DRX) ON duration associated with a UE for an extension duration, wherein the extension duration is based on a BFD-reference signal (BFD-RS) periodicity; and
transmit a beam switching command for initiating a beam switching procedure associated with the UE.

30. The apparatus of claim 29, further comprising at least one transceiver or an antenna coupled to the at least one processor.

* * * * *